United States Patent [19]

Borovina et al.

[11] 3,896,992
[45] July 29, 1975

[54] HEAT RECOVERY SYSTEM FOR SPACE HEATING AND FOR POTABLE WATER HEATING

[76] Inventors: Anton Borovina, 67 Columbia St., Port Jefferson Station, N.Y. 11152; Henry E. Grattan, Conscience Cir., Setauket, N.Y. 11103

[22] Filed: July 18, 1974

[21] Appl. No.: 489,700

[52] U.S. Cl. ................. 237/19; 122/20 B; 237/8 R; 122/33
[51] Int. Cl.² ...................... F24D 3/08; F24H 1/22
[58] Field of Search ................. 237/19, 8 R, 59, 55; 126/101; 122/20 A, 20 B, 33

[56] References Cited
UNITED STATES PATENTS

| | | | |
|---|---|---|---|
| 1,839,461 | 1/1932 | Beman | 122/20 B |
| 2,026,399 | 12/1935 | Pierce | 122/20 B |
| 2,201,406 | 5/1940 | Miller | 122/33 |
| 2,521,462 | 9/1950 | Kinzelmann | 237/19 |
| 2,704,188 | 3/1955 | Bergmann | 237/19 |
| 2,781,174 | 2/1957 | Smith | 237/19 |
| 2,827,893 | 3/1958 | Ribaudo et al. | 237/19 |
| 3,661,325 | 5/1972 | Altenstadt | 237/8 R |

FOREIGN PATENTS OR APPLICATIONS 1,201,103  12/1959  France .................................. 237/19

*Primary Examiner*—John J. Camby
*Assistant Examiner*—Henry C. Yuen
*Attorney, Agent, or Firm*—Shoemaker and Mattare

[57] ABSTRACT

In a hot water heating system for both space heating and potable water heating, a plurality of space heaters, a furnace and a source of potable water, a plurality of pipes connected between the heaters and the furnace and between the source of potable water and the furnace to circulate the water for heating, the plurality of pipes including heat recovery pipes in heat exchange relationship with the hot flue gasses in the flue of the furnace to heat the water for the space heaters and to preheat the potable water, and controls operatively connected to the pipes to first effect circulation of water through the heat recovery pipes and through the space heaters and then to effect circulation of water through the heat recovery pipes to heat the potable water dependent upon demand, to thus substantially increase the economy and efficiency of operation of the hot water heating system.

11 Claims, 5 Drawing Figures

PATENTED JUL 29 1975 3,896,992

SHEET 1

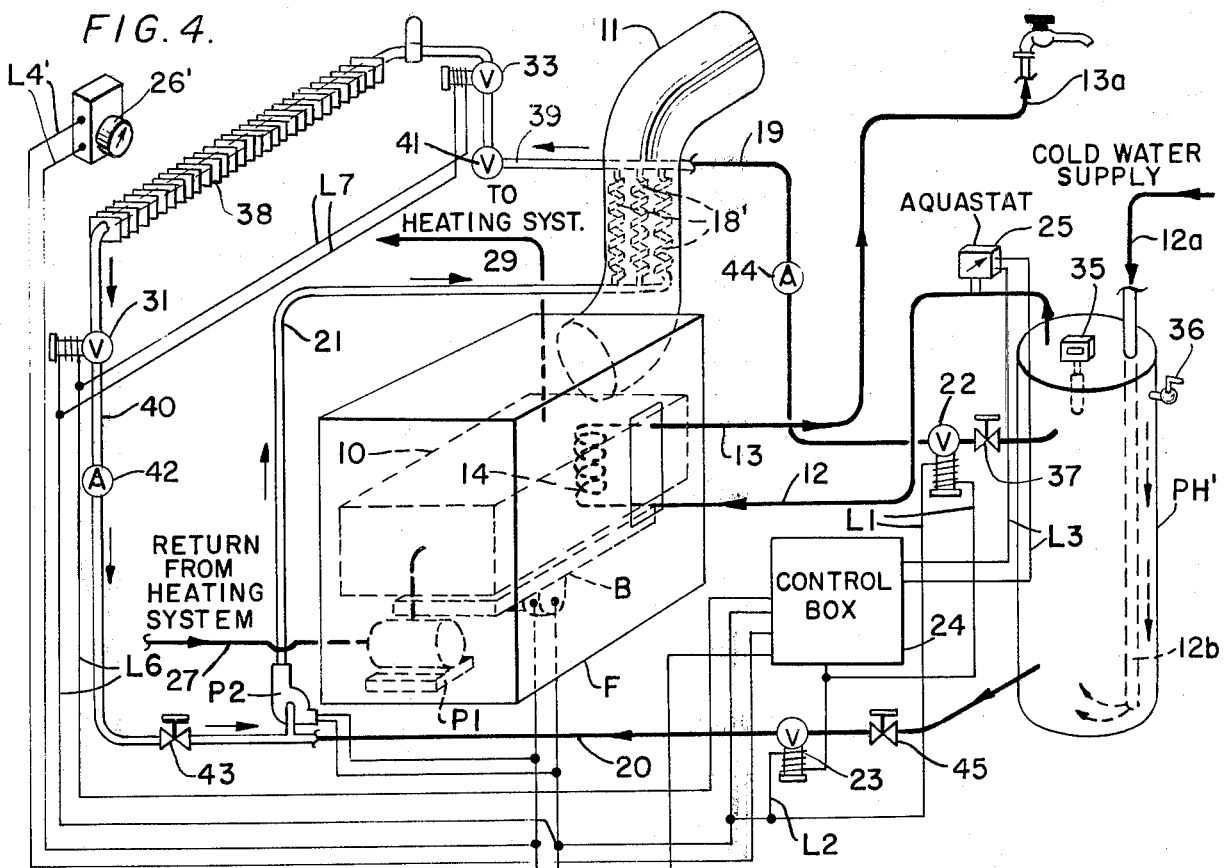

3,896,992

HEAT RECOVERY SYSTEM FOR SPACE HEATING AND FOR POTABLE WATER HEATING

BACKGROUND OF THE INVENTION

This invention relates to heat recovery systems for hot water heating systems which include a furnace or boiler, and which are used to heat water for both space heaters and potable water. The word furnace as used herein is intended to apply to those systems in which heat is applied to heat water and wherein hot, gaseous products of combustion, or flue gasses, are produced. The heat recovery system of the invention utilizes the temperature of the hot flue gasses from the boiler, or furnace, to increase the temperature of the water in the space heating system and in the potable water heating system, thus reclaiming a large amount of energy which is normally wasted.

In particular, the present invention relates to such a system wherein a plurality of pipes are connected between the boiler or furnace and the space heaters and between a source of potable water and the boiler or furnace, said plurality of pipes being connected with a plurality of heat recovery pipes which are in heat exchanging relationship with the hot flue gasses in the boiler or furnace, and control means including valves are connected with the pipes to first effect flow of water through the heat recovery pipes and to the space heaters and then to effect flow of water through the heat recovery pipes and to a heating means for the potable water, dependent upon demand, to thus substantially increase the efficiency and economy of operation of the hot water heating system.

Various hot water heating systems are known in the prior art, including systems which utilize the heat of flue gasses from a furnace or boiler or the like to improve the efficiency of the system. However, such prior art devices are relatively complicated and expensive in construction and are not as efficient or reliable in operation as the present invention.

According to one form of the present invention, space heating pipes are connected with the primary space heaters of the system and with the boiler for circulating hot water to the space heaters, and potable water heating pipes are connected between a source of potable water and the boiler and a point of use of the potable water to heat and circulate the potable water. A common heat recovery pipe or heat exchange or heat recovery means is connected with both the space heating pipes and with the potable water heating pipes, and control means are connected in the respective pipes to effect flow first through the heat recovery pipes and into the space heating pipes to increase the efficiency of operation of the space heating system and to then effect flow through the recovery pipes into heat exchanging relationship with the potable water heating pipes to preheat the potable water and thus increase the efficiency of operation of the potable water heating system. The control means for effecting selective control of flow through the recovery heating pipes is responsive to the demand on the space heating system and gives preference to the space heating system, and is also responsive to the potable water heating system when there is no demand from the space heating system.

According to another form of the invention, an arrangement similar to that above is provided, but the heat recovery system is connected with auxiliary or secondary space heaters which are separate from the primary space heaters connected with the boiler.

OBJECTS OF THE INVENTION

Therefore, it is an object of this invention to provide a heat recovery system for a hot water system, including means for space heating and for potable water heating, wherein the heat recovery system includes a common pipe means connected with both the space heating system and the potable water heating system and having control means or heat exchange means operatively associated therewith to first effect flow of water through the heat recovery pipes and into the space heating system, and then to effect flow through the heat recovery pipes and into heat exchanging relationship with the potable water heating system, said controls being designed to give preference to the space heating system over the potable water heating system.

BRIEF DESCRIPTION OF THE DRAWINGS

FIGS. 4 and 5 are schematic perspective views corresponding to FIGS. 1 and 2, respectively, of a modified system, in which separate, additional space heaters are used in the heat recovery system.

DETAILED DESCRIPTION OF THE INVENTION

Figure 1:
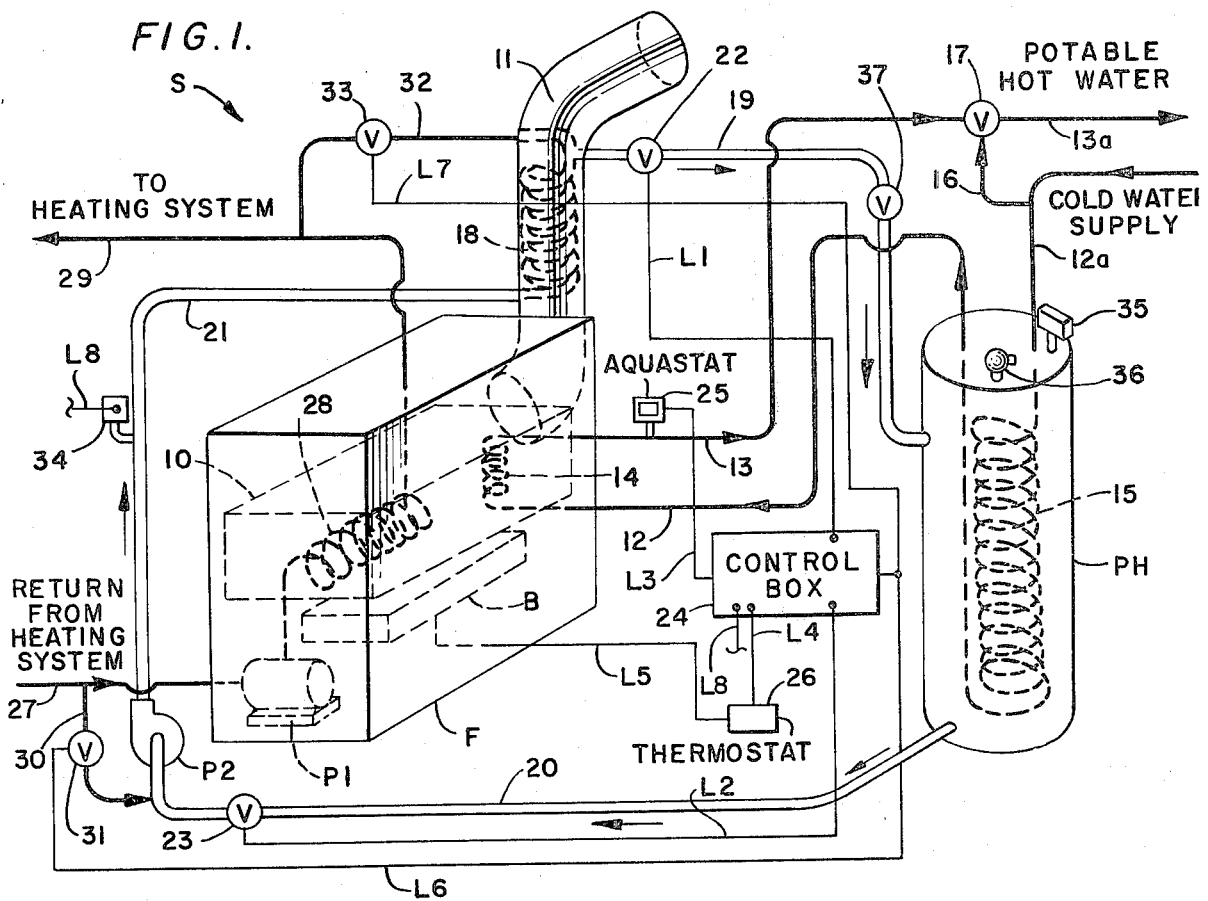
FIG. 1 is a schematic, perspective view of a hot water heating system and the heat recovery system according to the invention, with the apparatus operative to preheat the potable water.

In the drawings, wherein like reference numerals indicate like parts throughout the several views, the hot water heating system S according to the invention includes a furnace or boiler F having any suitable burner means, such as a gas burner or oil burner or the like B therein for heating water in a boiler tank 10 in the furnace or boiler above the burner B. A flue 11 extends from the boiler for conducting exhaust gasses of the burner away from the boiler. A pair of pipes 12 and 13 comprising a portion of the potable water heating system are connected with the inlet and outlet, respectively, of a heat exchange coil 14 disposed in heat exchanging relationship with the hot water in the boiler 10 for heating potable water supplied from a cold water supply through pipe 12a and supplied to the faucets and other points of use through a potable hot water supply pipe 13a. The cold water supply pipe 12a is connected with one end of a heat exchange coil 15 disposed inside a potable water preheat tank PH and the pipe 12 is connected with the other end of the heat exchange coil 15. A pipe 16 is connected between the cold water supply pipe 12a and a mixing valve 17 in the potable hot water supply pipe 13a for mixing cold water with the hot water in a predetermined relationship to maintain the temperature of the hot water in the supply pipe 13a within tolerable limits.

A heat exchange coil or heat recovery means 18 is disposed within the flue 11 in heat exchanging relationship with the flue gasses discharged through the flue, and a potable water preheat pipe 19 is connected at one end with the heat exchange coil 18 and is connected at its other end with the preheat tank PH. A further potable water preheat pipe 20 is connected at one end thereof with the potable water preheat tank PH near the bottom of the tank and is connected at its other end with a circulating pump P2.

A connecting pipe 21 is connected at one end thereof with the outlet of the circulating pump P2 and is connected at its other end with the heat exchange coil 18 in the flue 11.

A pair of potable water preheat control valves 22 and 23 are operatively positioned in the pipes 19 and 20, respectively, for controlling flow therethrough, and these valves are normally closed, but are opened in response to a suitable signal from a control box or device 24 conveyed to the valves 22 and 23 via lines L1 and L2, for example. The valves may be electromagnetically operated valves or pneumatically or hydraulically operated valves, as desired, and the control box 24 may include suitable conventional controls operative to operate the valves 22 and 23 in response to a sensed condition as determined by an aquastat 25, preferably positioned in the potable hot water supply pipe 13, and a thermostat 26, which is preferably positioned in the area heated by means of space heaters (not shown). The aquastat 25 is connected via a line L3 with the control box 24, and the thermostat 26 is connected via a line L4 with the control box and is connected via a line L5 with the burner B in the furnace for controlling operation of the burner B in response to a condition sensed by the thermostat 26. Preferably, the thermostat 26 overrides the aquastat 25, such that preference is given to the space heating system, but in the event the temperature in the space is adequate, the aquastat 25 is then effective to initiate operation of the valves 22 and 23 to open position to effect flow through the potable hot water preheat pipes or system 19, 20 and 21 and coil 18 and through the preheat tank PH to preheat the water flowing through pipes 12a and 12.

The space heating system includes a return pipe 27 returning from the space heaters to a space heating circulating pump P1, and from the pump P1 the return pipe is connected with one end of a heat exchange coil 28 disposed in heat exchanging relationship with the water in the boiler 10 in the furnace. If desired, the coil 28 could be omitted and the water merely circulated through the boiler tank 10. A space heating supply pipe 29 is connected with the other end of the heat exchange coil 28 and with the space heaters (not shown) to supply hot water to the space heaters for heating the space. A bypass pipe 30 is connected at one end with the return pipe 27 and at its other end with the pipe 20 leading to the inlet of circulating pump P2 and flow through the bypass pipe 30 is controlled by a valve 31, said valve being normally open, whereby at least a portion of the return water from the space heaters is circulated through the bypass pipe 30 and through the pump P2 and connecting pipe 21 and thence through the heat exchange coil 18 and through a further bypass pipe 32 and normally open valve 33 back into the heating system supply pipe 29. The valves 31 and 33 are controlled in response to a sensed signal conveyed to the control box 24 and sent to the valves 31 and 33 via lines L6 and L7.

Thus, the heating system of the invention includes a heat recovery system having a common connecting pipe and heat recovery coil 18, with valves interposed in the piping to effect control through the pipes such that heat recovery can be utilized to add heat to the heating system water, or alternatively, to preheat the potable hot water supply. A simple and effective piping arrangement is thus provided, and a simple control means, including four valves whose operation is controlled in response to a suitable conventional control box, is provided for effecting control of the heat recovery system as it relates to the space heating system and the potable hot water heating system.

In FIG. 1, for example, let it be assumed that the temperature sensed by the thermostat 26 is at an adequate level, and that the temperature sensed by aquastat 25 is below that desired to be maintained in the potable hot water pipe 13. Accordingly, the control box 24 will send a proper signal to valves 22, 23, 31 and 33 to close valves 31 and 33 and open valves 22 and 23, whereby flow through the heat recovery system will be through potable hot water preheat pipe 19 and preheat tank PH and pipe 20, and through circulating pump P2 and connecting pipe 21 and heat recovery coil 18, to thus preheat the cold water supply in heat exchange coil 15 to thus enable the potable hot water to be heated to a desired temperature with less energy required from the burner B than would otherwise be required.

Figure 2:
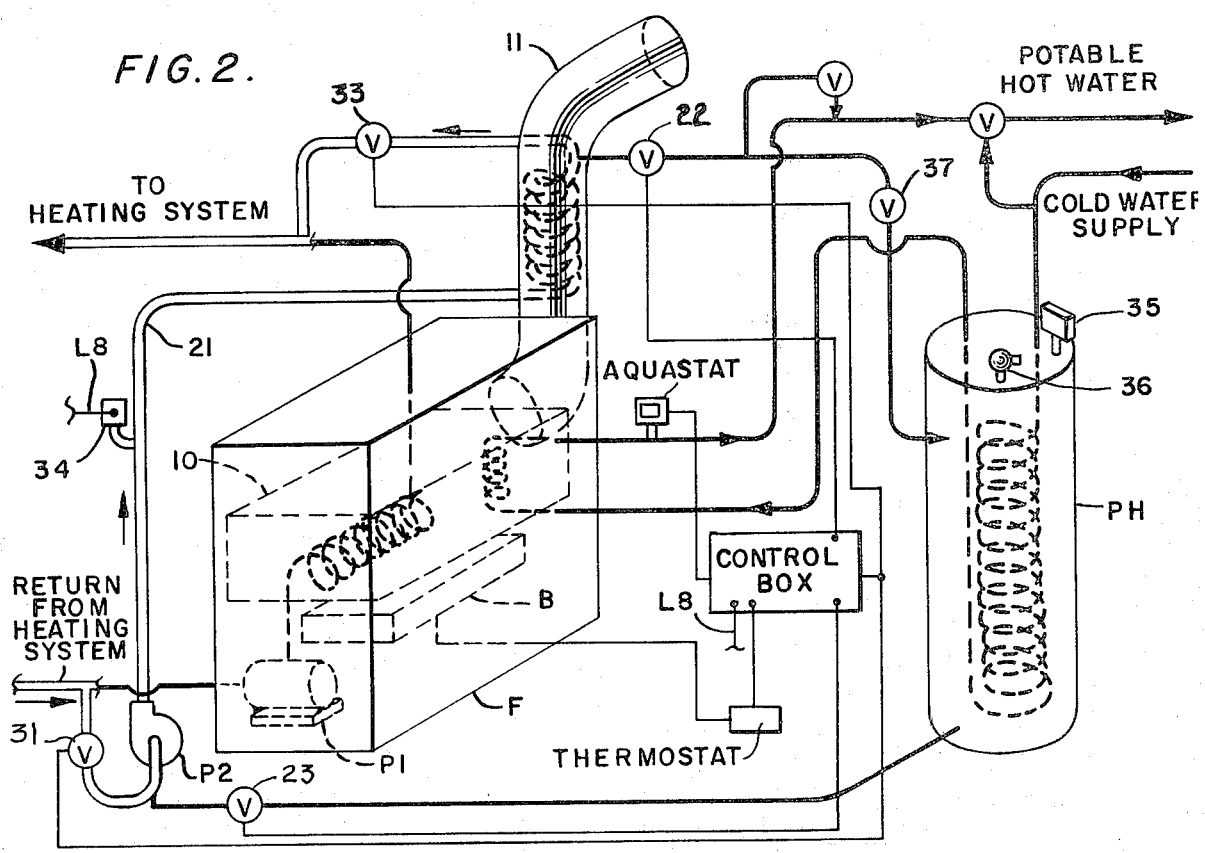
FIG. 2 is a view similar to FIG. 1, with the apparatus operative to add heat to the heating system for the space heaters.

Alternatively, and as seen in FIG. 2, if the temperature sensed by thermostat 26 is less than the desirable level, the thermostat sends an appropriate signal to the control box 24, which, in turn, sends an appropriate signal to valves 22, 23, 31 and 33 to effect closing of valves 22 and 23 and opening of valves 31 and 33, whereby flow of the heat recovery water is through the bypass pipe 30 and pump P2 and connecting pipe 21 and through the heat recovery coil 18 and bypass pipe 32 and valve 33 into the heating system supply pipe 29, to thus add heat to the space heating water, said added heat being reclaimed from the temperature of the flue gasses in the flue 11.

Of course, the heat recovery system is an addition to both the space heating system and the potable water heating system, and both of these systems are capable of operating, and do operate, even though the heat recovery system may be connected with the other of the two systems. In other words, in FIG. 1 the space heating hot water will flow through the return pipe 27 and pump P1 and heat exchange coil 28 and thence to the heating system supply pipe 29, even though the recovery system is connected to preheat the water in preheat tank PH. Similarly, in FIG. 2 even though the heat recovery system is connected to add heat to the space heating system, the potable water will be supplied through supply pipe 12a and through coil 15 and pipe 12 to the heat exchange coil 14 in the boiler 10, and thence through supply pipe 13 and 13a to the point of use.

The heat recovery system of the invention is very simple and economical and may be added to existing systems without requiring major changes thereto, and when employed, results in a significant savings in energy.

Various safety devices are associated with the system, and include a high pressure switch 34 connected in the pipe 21 of the heat recovery system and operatively connected with the control box via a line L8, such that in the event the valves in the heat recovery system would malfunction or for some other reason the temperature and pressure in the heat recovery system would become excessively high, the high pressure switch 34 sends a signal to the control box, which in turn denergizes the system. Also, a pressure gauge 35 is mounted on the preheat tank PH for providing a visual indication of the pressure within the tank, and a pressure relief valve 36 is connected with the tank for relieving excess pressure therefrom. Also, a manually operated shutoff valve 37 is provided in the pipe 19 for stopping circulation of water through the preheat tank PH, if desired.

Figure 3:
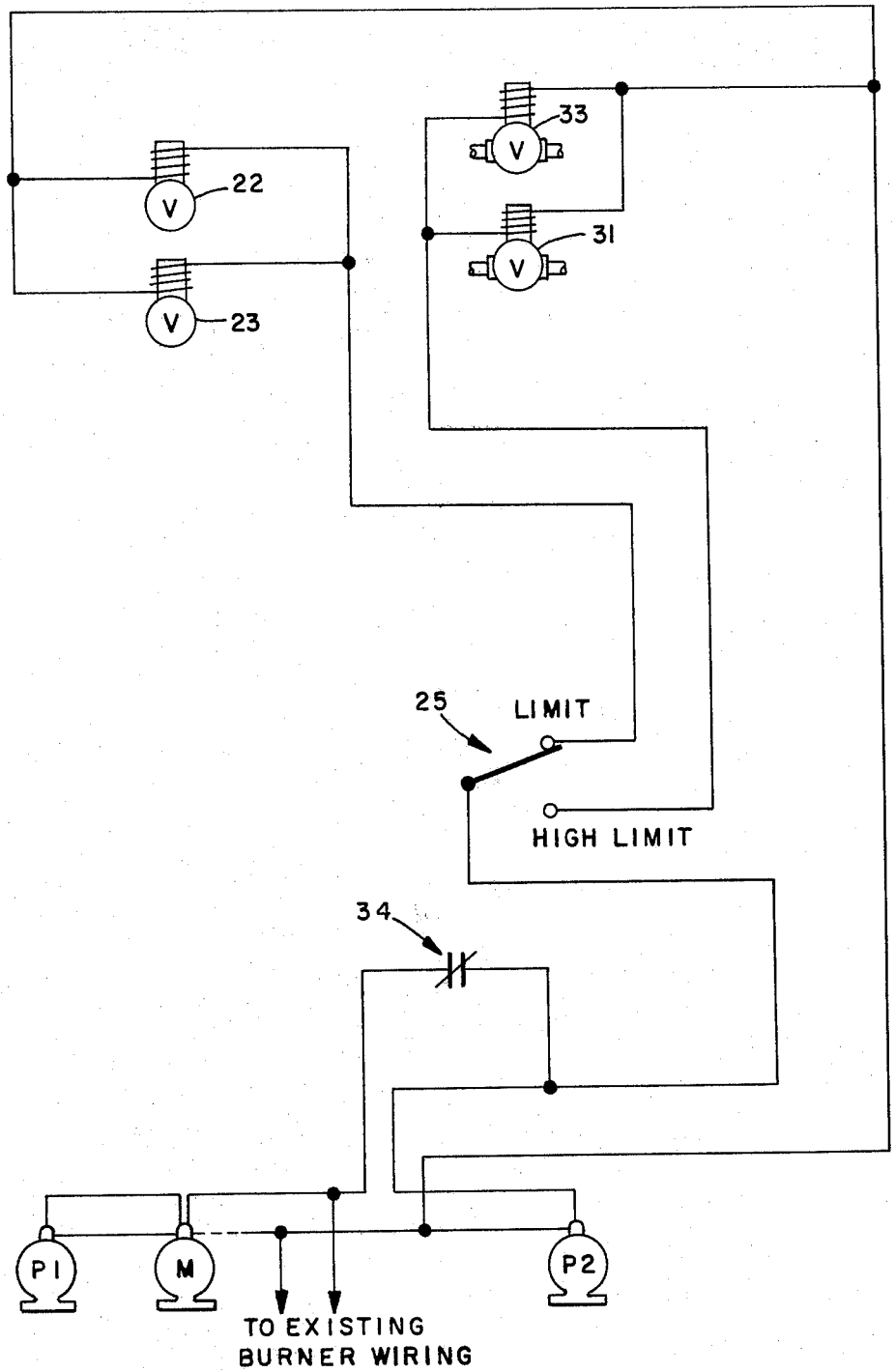
FIG. 3 is a schematic circuit diagram of a portion of the control circuit for the apparatus of FIGS. 1 and 2.

As seen in FIG. 3, the pumps P1 and P2 are wired with the burner motor M, such that the pumps are energized upon energization of the burner motor B to effect circulation of the water and prevent it from remaining within the boiler and thus becoming overheated.

Also, the high-limit, low-limit switch or aquastat 25 functions in response to the temperature in pipe 13 to energize either the pair of valves 22 and 23 or the pair of valves 31 and 33, depending upon the conditions sensed by the thermostat 26 and aquastat 25.

The control circuit of FIG. 3 is connected with conventional existing burner wiring (not shown).

In FIGS. 4 and 5, a modified arrangement is illustrated which is similar to that described above and like parts are indicated by like reference numerals. However, in this system auxiliary heaters 38 are connected with the heat recovery pipes 39 and 40 and are in addition to the space heaters normally provided with the hot water heating system. The heat recovery pipes 39 and 40 are connected with heat recovery coils 18' in the flue 11, and the heat recovery coils preferably comprise three coils connected in parallel. Solenoid valves 31 and 33 are connected in pipes 40 and 39, respectively, to control flow therethrough in response to signals from control box 24, and a separate thermostat 26' is connected with the control box via lines L4'. Moreover, a safety valve 41 is connected in pipe 39 to relieve excessive pressure, a check valve 42 is connected in pipe 40 to prevent flow in a reverse direction to the heaters 38, and a manually operated valve 43 is also connected in pipe 40 to manually close off flow through the space heaters 38.

On the potable water side of the system, supply water is supplied from pipe 12a to preheat tank PH', the supply water entering a vertical pipe 12b and being discharged therefrom into the bottom of the tank PH'. The potable water then flows through pipe 20, pump P2 and pipe 21 to coils 18', and thence through pipe 19 back to the tank PH'. Flow through the potable water heating system is controlled by solenoid valves 22 and 23 in pipes 19 and 20, respectively, and by a check valve 44 and manual shut off valve 37 in pipe 19 and by a further manual shut off valve 45 in pipe 20.

Moreover, the water returned through pipe 27 from the primary heating system is discharged into the boiler tank 10 rather than being caused to flow through a coil 28. Otherwise, the operation of the embodiment disclosed in FIGS. 4 and 5 is substantially the same as previously described.

In FIG. 4, the system is shown in operative condition for recovering heat to heat the water in the space heaters 38, and in FIG. 5, the system is shown in operative condition for recovering heat to heat the potable water.

It should be noted that in this modified arrangement, the water in the additional space heater system is under a high pressure since it is in communication with the tank PH' and potable water system.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A hot water heating system for both space heating and potable water heating, comprises a furnace having heat generating means therein and a flue for carrying hot, gaseous products of combustion away therefrom, a plurality of space heating pipes connected at one of their ends in heat exchange relationship with the heat generating means in the furnace and adapted to be connected to a plurality of space heating means to circulate hot water from the furnace to the space heating means and back to the furnace, a plurality of potable water pipes connected with a source of potable water and with the heat generating means in the furnace to heat the potable water and circulate it to a point of use, a separate heat recovery means in the flue exposed to the heat of flue gases in the flue, a first plurality of heat recovery pipes connected to the heat recovery means and to the space heating pipes, and a second plurality of heat recovery pipes connected with the said heat recovery means and the potable water pipes, to reclaim at least part of the heat of the flue gas and to heat water in both the space heating means and the potable water pipes, and control means responsive to temperature in a space being heated and to the temperature of the hot potable water to alternately effect heat exchange between the heat recovery pipes and the space heating pipes, and between the heat recovery pipes and the potable water pipes, said control means including means to first effect supply of heat from the heat recovery pipes to the space heating pipes in response to demand and when the demand is satisfied to effect supply of heat to the potable water pipes, whereby the efficiency and economy of operation of the hot water heating system is greatly enhanced.

2. A hot water heating system for both space heating and potable water heating, comprises a furnace having heat generating means therein and a flue for carrying hot, gaseous products of combustion away therefrom, a plurality of first space heating pipes connected at one of their ends in heat exchange relationship with the heat generating means in the furnace and adapted to be connected to a plurality of first space heating means to circulate hot water from the furnace to the first space heating means and back to the furnace, a storage tank for potable hot water, a cold water supply pipe connected with the potable hot water storage tank, a plurality of potable water pipes connected with the hot water tank and with the heat generating means in the furnace to heat the potable water and circulate it to a point of use, a separate heat recovery means in the flue exposed to the heat of flue gases in the flue, a plurality of heat recovery pipes connected to the potable hot water storage tank and to the heat recovery means to add heat to the water in the hot water storage tank, second space heating means separate from the first space heating means, a plurality of second space heating pipes connected to the second space heating means and to the said heat recovery means in the flue to provide hot water to the second space heating means from the heat of the flue gases, said second space heating means connected in fluid communication with the hot water storage tank, and control means operatively connected with the heat recovery pipes and with the second space heating pipes to alternately effect heat exchange between the heat recovery means and the second space heating means, and between the heat recovery means and the hot water storage tank, said control means including means to first effect supply of heat from the heat recovery means to the second space heating means in response to demand and when the demand is satisfied to effect supply of heat to the hot water storage tank, whereby the efficiency and economy of operation of the hot water heating system is greatly enhanced.

3. A hot water heating system as in claim 1, wherein the space heating pipes include a return pipe connected to return water from the space heating means and a space heating supply pipe connected to supply heated water to the space heating means, said return pipe connected to one end of a space heating heat exchange means in the furnace adjacent the heat generating means, and the supply pipe connected to the other end of space heating heat exchange means, and wherein is included a potable hot water storage tank, a heat exchange coil inside said tank, said potable water pipes including a cold water supply pipe adapted to be connected to a source of potable water and connected with an inlet of the heat exchange coil in the tank, a pipe connected at one end with an outlet of the coil in the tank and connected at its other end with a potable water heat exchange means in the furnace adjacent the heat generating means, and a potable hot water discharge pipe connected at one end with the potable water heat exchange means and extending at its other end to a point of use.

4. A hot water heating system as in claim 3, wherein said separate heat recovery means comprises a heat recovery coil in said flue having an inlet end and an outlet end, said first plurality of heat recovery pipes includes a first bypass pipe connected with the return pipe and with the inlet end of the heat recovery coil and a second bypass pipe connected with the outlet end of the heat recovery coil and with the space heating supply pipe, to bypass at least a portion of the space heating water through the heat recovery coil, and said second plurality of heat recovery pipes includes a first potable water preheat pipe connected with the tank and with the inlet end of the heat recovery coil and a second potable water preheat pipe connected with the outlet end of the heat recovery coil and with the tank, to circulate water from the tank through the heat recovery coil and back to the tank to preheat potable water in the heat exchange coil in the tank.

5. A hot water heating system as in claim 4, wherein said control means includes a thermostat in a space being heated by the space heating means, and an aquastat connected in the potable hot water discharge pipe, electrical circuit means connected with the thermostat and with the aquastat, a control device connected in the circuit to receive signals from the aquastat and thermostat, a solenoid valve in each of the first bypass pipe, the second bypass pipe, the first potable water preheat pipe and the second potable water preheat pipe, said solenoid valves connected in said circuit with said control device, said solenoid valves in said first and second bypass pipes being normally open and the solenoid valves in the first and second potable water preheat pipes being normally closed, whereby water heated in said heat recovery coil is normally mixed with water in the space heating means to add heat thereto, and when a predetermined temperature is sensed by the thermostat the control device is operative to effect closing of the solenoid valves in the first and second bypass pipes and to effect opening of the solenoid valves in the first and second potable water preheat pipes to thus add heat to the potable water.

6. A hot water heating system as in claim 2, wherein the control means includes a thermostat in a space being heated by the second space heating means and an aquastat connected in operative relationship with the potable water pipes connected between the hot water tank and the heat generating means in the furnace.

7. A hot water heating system as in claim 6, wherein the separate heat recovery means includes coil means disposed in the flue and having an inlet and an outlet, said plurality of heat recovery pipes include a first pipe connected at one end thereof to the hot water storage tank near the bottom thereof and connected at the other end thereof with the inlet of the coil means, and a second pipe connected at one end thereof with the outlet of the coil means and connected at its other end with the hot water storage tank near the top thereof, and wherein said plurality of second space heating pipes includes a supply pipe connected at one end thereof with the outlet of the said coil means and connected at its other end with space heating means, and a return pipe connected at one end thereof with the space heating means and connected at its other end with the inlet of the said coil means.

8. A hot water heating system as in claim 7, wherein said control means further includes valve means in each of said first and second heat recovery pipes and in each of said supply and demand space heating pipes, valve operating control means connected with said valve means and connected with said thermostat and aquastat and responsive to conditions sensed by the thermostat and aquastat to effect opening and closing of said valve means.

9. A hot water heating system as in claim 8, wherein said valve means are solenoid operated and said valve operating control means is operative to open the valve means in the supply and demand pipes of the space heating means when the thermostat senses a predetermined low temperature in the space being heated and to simultaneously close the valve means in the first and second pipes connected with the hot water storage tank, and said valve operating control means is operative to effect closing of said valve means in said supply and return pipes and opening of the valve means in the first and second pipes when the temperature sensed by the thermostat reaches a predetermined valve.

10. A hot water heating system as in claim 9, wherein the cold water supply pipe opens into said hot water storage tank and said first and second pipes also open into the hot water storage tank, whereby the potable water is mixed with the water for said second space heating means.

11. A hot water heating system as in claim 10, wherein a pump means is connected with said coil means to effect circulation of the water through the coil means and through the second space heating means and the hot water storage tank, and wherein said coil means comprises three coils connected in parallel.

* * * * *